(12) United States Patent
Deighton et al.

(10) Patent No.: US 9,543,059 B2
(45) Date of Patent: Jan. 10, 2017

(54) SUBSEA UMBILICAL

(75) Inventors: Alan Deighton, Sunderland (GB); Joe Siu Kit Wong, Newcastle Upon Tyne (GB)

(73) Assignee: TECHNIP FRANCE SA (FR)

( * ) Notice: Subject to any disclaimer, the term of this patent is extended or adjusted under 35 U.S.C. 154(b) by 186 days.

(21) Appl. No.: 12/440,997

(22) PCT Filed: Sep. 4, 2007

(86) PCT No.: PCT/GB2007/003307
§ 371 (c)(1),
(2), (4) Date: Jun. 12, 2009

(87) PCT Pub. No.: WO2008/032019
PCT Pub. Date: Mar. 20, 2008

(65) Prior Publication Data
US 2010/0044068 A1 Feb. 25, 2010

(30) Foreign Application Priority Data

Sep. 14, 2006 (GB) .................................. 0618108.5
Jun. 20, 2007 (GB) .................................. 0711859.9

(51) Int. Cl.
*H01B 11/04* (2006.01)
*H01B 7/14* (2006.01)
(Continued)

(52) U.S. Cl.
CPC .............. *H01B 7/14* (2013.01); *H01B 7/0072* (2013.01); *H01B 7/045* (2013.01); *H01B 7/285* (2013.01); *H01B 7/2813* (2013.01)

(58) Field of Classification Search
CPC ..................................................... H01B 11/04
(Continued)

(56) References Cited

U.S. PATENT DOCUMENTS 4,096,346 A * 6/1978 Stine et al. ..................... 174/36
4,327,248 A * 4/1982 Campbell ..................... 174/107
(Continued)

FOREIGN PATENT DOCUMENTS

EP 0 822 562 11/1998
EP 1 691 377 8/2006
(Continued)

OTHER PUBLICATIONS

Notification Concerning Transmittal of Copy of International Preliminary Report on Partentability (Chapter I of the Patent Cooperation Treaty) issued Mar. 17, 2009 in corresponding International Application No. PCT/GB2007/003307.
(Continued)

*Primary Examiner* — Chau N Nguyen
(74) *Attorney, Agent, or Firm* — Ostrolenk Faber LLP

(57) ABSTRACT

An umbilical for use in the offshore production of hydrocarbons, the umbilical comprising a plurality of functional elements contained within an outer sheath, at least one of said functional elements comprising a multicore electric cable, said multicore electric cable comprising a plurality of insulated electric conductors electrically insulated from each other and assembled together in a helical or S/Z manner, said multicore electric cable further comprising a protective polymer sheath surrounding said plurality of insulated electric conductors, said multicore electric cable further comprising a tubular metallic layer located inside said protective polymer sheath and surrounding said plurality of insulated electric conductors.

16 Claims, 2 Drawing Sheets

(51) Int. Cl.
*H01B 7/00* (2006.01)
*H01B 7/285* (2006.01)
*H01B 7/04* (2006.01)
*H01B 7/28* (2006.01)

(58) Field of Classification Search
USPC .......................... 174/47, 105 R, 113 R, 107
See application file for complete search history.

(56) References Cited

U.S. PATENT DOCUMENTS

| | | | |
|---|---|---|---|
| 4,375,313 A | 3/1983 | Anderson et al. | |
| 4,525,813 A | 6/1985 | Burrage | |
| 4,791,246 A | 12/1988 | Neuroth | |
| 5,451,718 A * | 9/1995 | Dixon | 174/102 R |
| 5,486,649 A * | 1/1996 | Gareis | 174/36 |
| 5,834,699 A * | 11/1998 | Buck et al. | 174/113 R |
| 5,902,958 A * | 5/1999 | Haxton | 174/47 |
| 5,956,445 A * | 9/1999 | Deitz et al. | 385/100 |
| 6,333,898 B1 * | 12/2001 | Knudsen et al. | 367/157 |
| 6,563,052 B2 * | 5/2003 | Groegl et al. | 174/106 R |
| 6,566,606 B1 * | 5/2003 | Hazy et al. | 174/113 R |
| 6,858,805 B2 * | 2/2005 | Blew et al. | 174/100 |
| 7,485,811 B2 * | 2/2009 | Mjelstad | 174/113 R |
| 2002/0003046 A1 * | 1/2002 | Clouet et al. | 174/108 |
| 2002/0092667 A1 | 7/2002 | Dalrymple et al. | |
| 2003/0141098 A1 | 7/2003 | Grogl et al. | |
| 2006/0137880 A1 * | 6/2006 | Figenschou et al. | 166/367 |

FOREIGN PATENT DOCUMENTS

| | | | |
|---|---|---|---|
| EP | 1 691 377 A2 | | 8/2006 |
| GB | 2165368 | * | 4/1986 |
| GB | 2 384 535 | | 7/2003 |

OTHER PUBLICATIONS

International Search Report dated Mar. 3, 2008, issued in corresponding international application No. PCT/GB2007/003307.
Search report dated Nov. 5, 2007 from the UK Intellectual Property Office on the corresponding UK patent application No. 0711859.9 (1 page).

* cited by examiner

SUBSEA UMBILICAL

CROSS REFERENCE TO RELATED APPLICATIONS

The present application is a 35 U.S.C. §371 National Phase conversion of PCT/GB2007/003307, filed Sep. 4, 2007, which claims benefit of British Application No. 0618108.5, filed Sep. 14, 2006, and British Application No. 0711859.9, filed Jun. 20, 2007, the disclosures of which are incorporated herein by reference. The PCT International Application was published in the English language.

FIELD OF THE INVENTION

The present invention relates to an umbilical for use in the offshore production of hydrocarbons.

BACKGROUND OF THE INVENTION

In subsea oil field operations, umbilicals are used to transport fluids, power, signals or data to and from a subsea installation. An umbilical comprises a group of one or more types of functional elements such as multicore low voltage electric cables, optical fibre cables, or hoses for fluid transportation of, for example, gas, water or chemical products such as methanol. These functional elements are assembled together in a helical or S/Z manner and over-sheathed and/or over-armoured for mechanical strength and ballast. It is desirable for a single umbilical to be able to contain as many functional elements as are required for a particular application, for example, as are required for a particular oil field where the umbilical is intended for use.

In the present application, "low voltage" should be understood as rated for a voltage smaller than 3000V, and typically smaller than 1000V. Low voltage multicore cables of subsea umbilicals are generally used to carry single phase power for control purposes and signal transmission. Typically a low voltage multicore power cable used in a subsea umbilical is rated at 250V and 3 A, so around 750 W in power. Low voltage multicore signal cables used in subsea umbilicals are operated at frequencies up to 20 kHz. These multicore low voltage cables typically have a very simple construction. Indeed, because of their low voltage, such multicore cables are not sensitive to moisture ingress, unlike medium and high voltage coaxial power cables (respectively rated at 6 kV to 30 kV and at more than 30 kV) which are known to be very sensitive to water ingress and may develop detrimental defects known as "water tree", and therefore require additional protective sheaths to prevent moisture ingress.

A problem with known electric cables within subsea umbilicals is that, over an extended period of time, in some circumstances related to the presence of sea water, small quantities of hydrogen appear inside the umbilical structure, and then diffuse inside the electric cables. The presence and the circulation of hydrogen gas inside the electric cables have several detrimental effects.

BRIEF SUMMARY OF THE INVENTION

The object of the present invention is to minimise or overcome this disadvantage.

According to the invention, there is provided an umbilical for use in the offshore production of hydrocarbons, the umbilical comprising a plurality of functional elements contained within an outer sheath, at least one of said functional elements comprising a multicore electric cable, said multicore electric cable comprising a plurality of insulated electric conductors electrically insulated from each other and assembled together in a helical or S/Z manner, said multicore electric cable further comprising a protective polymer sheath surrounding said plurality of insulated electric conductors, said multicore electric cable further comprising a tubular metallic layer located inside said protective polymer sheath and surrounding said plurality of insulated electric conductors.

The metallic layer acts as a barrier against the diffusion of hydrogen from the outside to the inside of the cable. This solution greatly reduces the amount of hydrogen gas diffusing inside the electric cable and inside the different electric conductors thereof, thus greatly reducing the amount of hydrogen gas circulating along the electric cable and conductors.

Preferably the multicore electric cable comprises a low voltage multicore electric cable.

Preferably, the tubular metallic layer is made of copper or aluminium. Copper is preferred because it has a lower permeability to hydrogen than aluminium.

According to a preferred embodiment of the invention, the tubular metallic layer is made of a metal strip helically wrapped with overlap around the plurality of insulated electric conductors.

According to another preferred embodiment of the invention, the tubular metallic layer is made of a metal strip longitudinally folded with overlap around the plurality of insulated electric conductors.

Preferably, the metal strip is also bonded or welded at the overlap, in order to improve its hydrogen gas tightness.

More preferably, the protective polymer sheath is also bonded to the tubular metallic layer. This prevents hydrogen gas from circulating along the cable between the tubular metallic layer and the protective polymer sheath.

Preferably, a hydrogen absorbent material is also provided inside at least one of the insulated electric conductors, so as to maintain the electric conductor in a substantially hydrogen free environment. Therefore, the small amount of hydrogen which has not been stopped by the tubular metallic layer is immediately suppressed by its chemical reaction with the hydrogen absorbent material contained inside the electric conductor.

Preferably, a hydrogen absorbent material is also provided inside the interstitial voids between the plurality of insulated electric conductors and the tubular metallic layer, and/or any filler material. This characteristic has a similar technical effect as the previous one.

Preferred embodiments of the present invention will now be described, by way of example, with reference to the accompanying drawings, in which:

DETAILED DESCRIPTION OF THE INVENTION

Figure 1:
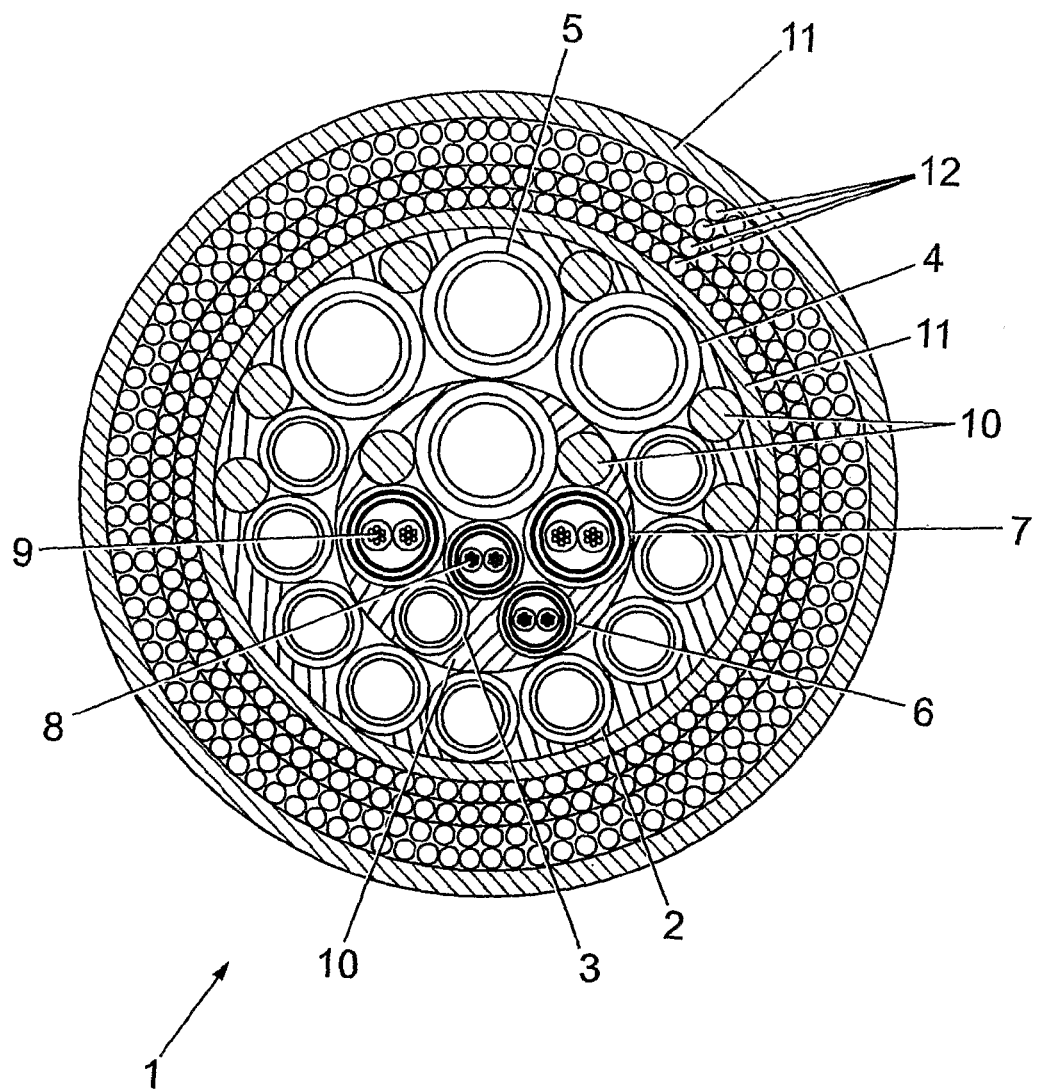
FIG. 1 is a cross section of a subsea umbilical according to an embodiment of the present invention.

As illustrated in FIG. 1, a subsea umbilical 1 contains a plurality of functional elements, including several hoses 2,3,4,5 and four multicore low voltage electric cables 6,7,8,9 (although other numbers of cables and functional elements are envisaged). These functional elements are assembled in S/Z manner together with fillers 10 and over-sheathed 11 and armoured 12 to form the umbilical.

Figure 2:
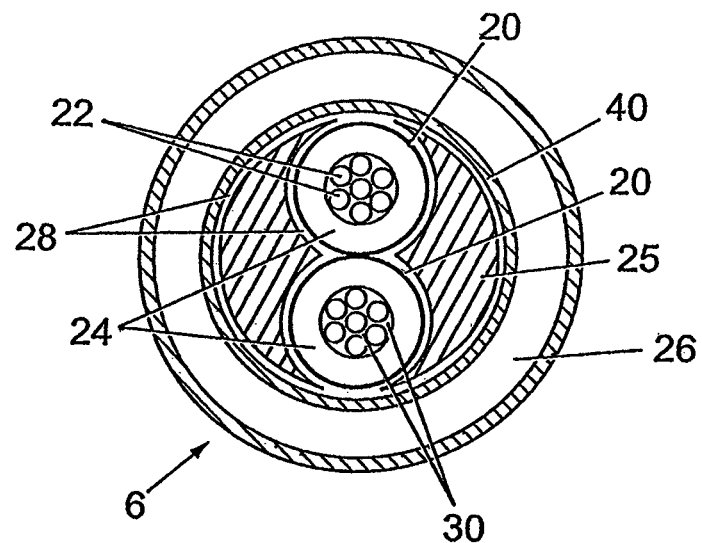
FIG. 2 is a cross section of a low voltage multicore electric cable for use in an umbilical according to a first embodiment of the present invention.

In a first embodiment of the present invention, as illustrated in FIG. 2, each multicore low voltage electric cable 6 comprises two electric conductors 20. However, it is envisaged that the multicore low voltage electric cable may comprise more than two conductors 20, typically three or four conductors. In the example shown, each conductor is made of seven stranded circular copper wires 22. It could also be possible to used solid conductors (according to the IEC 60228 International Standard) without departing from the present invention. Each conductor 20 is sheathed by an electrical insulation polymer sheath 24. Both insulated conductors 20 are assembled in a helical or S/Z manner together with filler material 25 to form a substantially cylindrical core. A copper tubular layer 40 surrounds this cylindrical core and thus both insulated conductors. The copper tubular layer 40 acts as a barrier reducing the hydrogen diffusion from the outside to the inside of the multicore low voltage electric cable 20. As well as protecting the cable from hydrogen ingress, the copper tubular layer 40 can also provide a further function, such as providing electrical grounding or shielding. The copper tubular layer 40 is over sheathed by a protective polymer sheath 26.

The copper tubular layer 40 may be made from a copper tape applied longitudinally and folded around the cylindrical core just before the extrusion of the protective polymer sheath 26. The copper tape has a typical thickness of 100 micrometers and is coated with a 25 micrometers thick copolymer which melts during the extrusion of the protective polymer sheath 26. This copolymers bonds to the protective polymer sheath 26 and also bonds to the overlapping copper, thus ensuring in a single step both the tightness of the tubular layer 40 at the overlap of the copper tape and the bonding of the tubular layer 40 with the protective polymer sheath 26.

The copper tubular layer 40 may alternatively be formed from a copper tape applied helically around the cylindrical core with continuous bonding at the overlap in order to achieve good hydrogen gas tightness. This solution improves the fatigue resistance of the cable under dynamic bending stresses. Preferably, glue is applied on the outside surface of the copper tubular layer 40 before the extrusion of the protective polymer sheath 26, thus bonding the copper tubular layer 40 with the protective polymer sheath 26.

Preferably, the interstices 30 between the copper wires 22 of conductors 20 are filled with a hydrogen absorbent material. Optionally, the interstices 28 between the insulated conductors 20 and the filler material 25, and between the filler material 25 and the copper tubular layer 40, are also filled with a hydrogen absorbent material. The hydrogen absorbent material may also be provided within the filler material 25. Thus, the residual hydrogen that is not stopped by the copper tubular layer 40 is suppressed by its reaction with the hydrogen absorbent material.

Suitable hydrogen absorbent materials comprise, for example, gels comprising sodium aluminium silicates which are rendered hydrogen absorbent by replacement of at least some of the sodium by an active metal, typically silver. Such materials are commonly known as zeolite.

Figure 3:
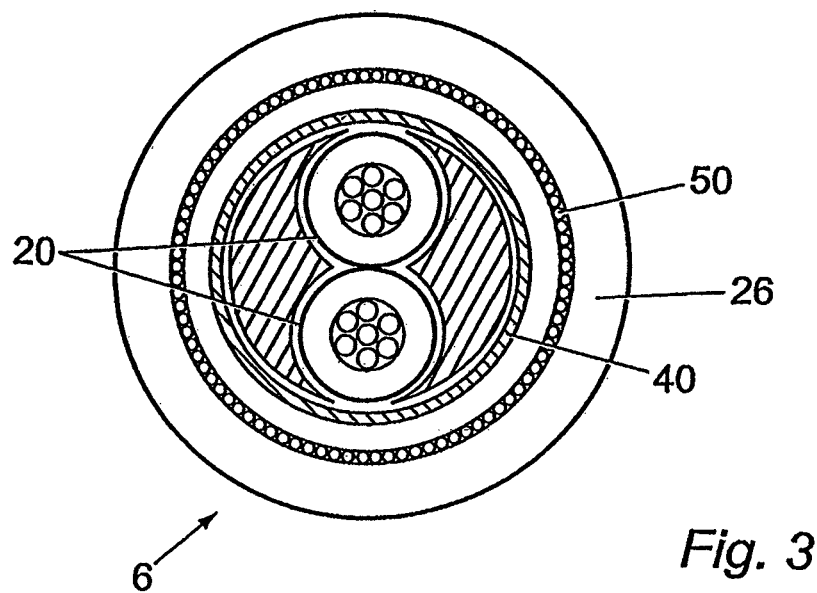
FIG. 3 is a cross section of a low voltage multicore electric cable for use in an umbilical according to a second embodiment of the present invention.

FIG. 3 shows an electric cable for use in an umbilical according to a second embodiment of the present invention. It differs from the previous embodiment by the fact that it comprises armouring wires 50 within the protective polymer sheath 26 for improving the mechanical resistance of the cable 20

Various modifications and variations to the described embodiments of the inventions will be apparent to those skilled in the art without departing from the scope of the invention as defined in the appended claims. Although the invention has been described in connection with specific preferred embodiments, it should be understood that the invention as claimed should not be unduly limited to such specific embodiments.

What is claimed is:

1. A subsea umbilical configured for use in offshore production of hydrocarbons, the umbilical comprising:
   an outer sheath;
   a plurality of functional elements contained within the outer sheath, said functional elements comprising a multicore electric cable and a hose that transports fluid;
   said multicore electric cable comprising:
   a plurality of insulated electric conductors electrically insulated from each other and assembled together in a helical or S/Z manner,
   a protective polymer sheath surrounding said plurality of insulated electric conductors, and
   a tubular metallic layer located inside said protective polymer sheath and surrounding said plurality of insulated electric conductors, said tubular metallic layer being a barrier against diffusion of hydrogen from an outside to an inside of said multicore electric cable,
   wherein the tubular metallic layer is made of a metal strip helically wrapped with overlap around the plurality of insulated electric conductors, and
   wherein the hose is positioned outside the protective polymer sheath.

2. An umbilical as claimed in claim 1, wherein the multicore electric cable comprises a low voltage multicore electric cable.

3. An umbilical as claimed in claim 1, wherein the tubular metallic layer is made of copper.

4. An umbilical as claimed in claim 1, wherein the tubular metallic layer is made of aluminium.

5. An umbilical as claimed in claim 1, wherein the metal strip is bonded at the overlap.

6. An umbilical as claimed in claim 1, wherein the metal strip is welded at the overlap.

7. An umbilical as claimed in claim 1, wherein the protective polymer sheath is bonded to the tubular metallic layer.

8. An umbilical as claimed in claim 1, further comprising a hydrogen absorbent material positioned inside at least one of the insulated electric conductors.

9. An umbilical as claimed in claim 1, further comprising a hydrogen absorbent material positioned inside interstitial voids between the plurality of insulated electric conductors and the tubular metallic layer.

10. A subsea umbilical configured for use in offshore production of hydrocarbons, the umbilical comprising:
    an outer sheath;
    a plurality of functional elements contained within the outer sheath, said functional elements comprising a multicore electric cable and a hose that transports fluid;
    said multicore electric cable comprising:
    a plurality of insulated electric conductors electrically insulated from each other and assembled together in a helical or S/Z manner,
    a protective polymer sheath surrounding said plurality of insulated electric conductors, and a tubular metallic layer located inside said protective polymer sheath and surrounding said plurality of insulated electric conductors, said tubular metallic layer being a barrier against diffusion of hydrogen from an outside to an inside of said multicore electric cable, wherein the tubular metallic layer is made of a metal strip longitudinally folded with overlap around the plurality of insulated electric conductors, and wherein the hose is positioned outside the protective polymer sheath.

11. The umbilical as claimed in claim 10, wherein the multicore electric cable comprises a low voltage multicore electric cable.

12. The umbilical as claimed in claim 10, wherein the tubular metallic layer is made of copper.

13. The umbilical as claimed in claim 10, wherein the tubular metallic layer is made of aluminium.

14. The umbilical as claimed in claim 10, wherein the protective polymer sheath is bonded to the tubular metallic layer.

15. The umbilical as claimed in claim 10, further comprising a hydrogen absorbent material positioned inside at least one of the insulated electric conductors.

16. The umbilical as claimed in claim 10, further comprising a hydrogen absorbent material positioned inside interstitial voids between the plurality of insulated electric conductors and the tubular metallic layer.

* * * * *